Oct. 6, 1970     E. H. AUGUSTIN ETAL     3,532,260

METHOD OF CUTTING GLASS EMPLOYING VIBRATORY ENERGY

Filed May 22, 1968

EUGENE H. AUGUSTIN
GEORGE J. PAGAN
INVENTORS

BY *John R. Faulkner*
*William E. Johnson*
ATTORNEYS

United States Patent Office 3,532,260
Patented Oct. 6, 1970

3,532,260
METHOD OF CUTTING GLASS EMPLOYING VIBRATORY ENERGY
Eugene H. Augustin, Dearborn Heights, and George J. Pagan, Dearborn, Mich., assignors to Ford Motor Company, Dearborn, Mich., a corporation of Delaware
Filed May 22, 1968, Ser. No. 731,236
Int. Cl. B26f 3/00
U.S. Cl. 225—2                    3 Claims

ABSTRACT OF THE DISCLOSURE

A method of cutting a glass template from a glass bracket has the following steps. A glass bracket, supported on a medium, is scored to a prescribed configuration by a glass scoring tool to define a glass template shape therein. Pressure in the form of vibratory energy is applied at a particular position adjacent the score. The pressure causes the fissures produced by the scoring operation to run through the unscored surface of the glass in the vicinity of the particular position. The position of application of the pressure is continuously moved along the score to complete, progressively, the running of the fissures of the score through the unscored surface of the glass. The position of pressure application may follow closely after the score placed on the glass so that the glass is opened through the unscored surface shortly after the score has been placed thereon.

BACKGROUND OF THE INVENTION

In general, to cut a glass template from a glass bracket, the glass bracket is scored by a scoring tool to define the shape of the glass template therein. The score produces fissures in the glass which extend downwardly from the scored surface of the glass toward the unscored surface of glass. In order to complete the cutting, it is necessary to apply pressure on the glass which places the unscored surface of the glass in tension. This tension causing pressure results in the running of the fissures completely through the unscored surface of the glass thereby completing the cutting of the glass template from the glass bracket.

SUMMARY OF THE INVENTION

This invention relates to a method of cutting glass and, more particularly, to a method employing vibratory energy to cut a glass template from a glass bracket.

In accordance with the teachings of the method of this invention, a score is placed on a glass bracket. The score causes fissures in the glass extending downwardly from the scored surface toward the unscored surface. The score is opened through the unscored surface of the glass at a particular position by applying vibratory energy adjacent the score at the particular position. The entire score is opened by moving the position of application of the vibratory energy along the score thereby to open progressively the fissures through the unscored surface of the glass to complete the cutting of the glass.

In further detail, the method of this invention teaches a method of cutting glass wherein the glass is scored by a moving scoring tool to define a glass template shape therein. A short distance behind the moving scoring tool, vibratory energy is applied to the score by a vibratory device to open the score in the vicinity of the position of application of vibratory energy. The scoring tool and vibratory device may be moved along the surface of the glass in a spaced, fixed relationship so that the scoring and opening of the score are carried out simultaneously but on different portions of the glass whereby a rapid and efficient cutting of a glass template from a glass bracket is accomplished.

DESCRIPTION OF THE PREFERRED EMBODIMENT

Figure 1:
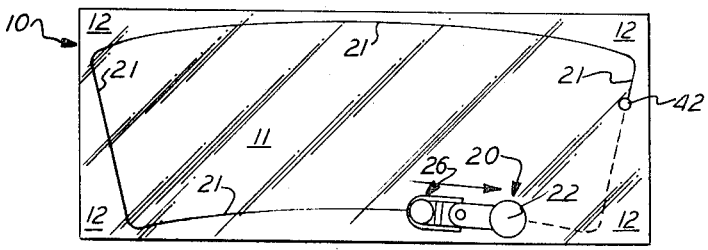
FIG. 1 is a plan view of apparatus which may be employed in the method of this invention.

In FIG. 1 there is seen a glass bracket 10 from which a glass template 11 is to be cut by the method of this invention. In the description of the preferred method of this invention, the glass template 11 will be a windshield template for automotive utilization. Cutting of the template 11 from the bracket 10 will leave areas of edge trim 12 to be discarded after the cutting operation has been completed.

Figure 2:
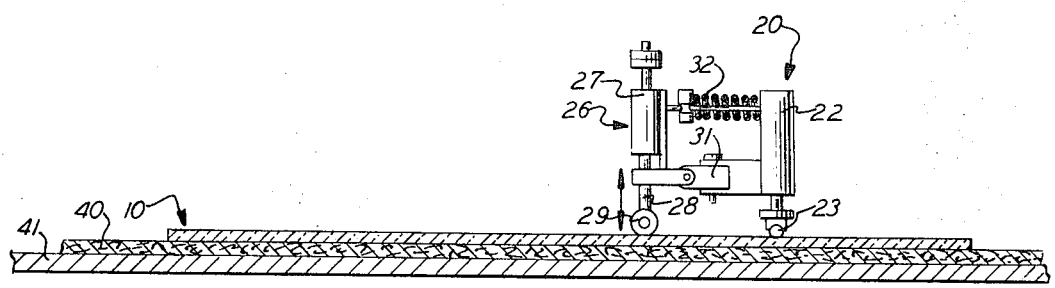
FIG. 2 is an elevational view showing details of the apparatus of FIG. 1.
Figure 3:
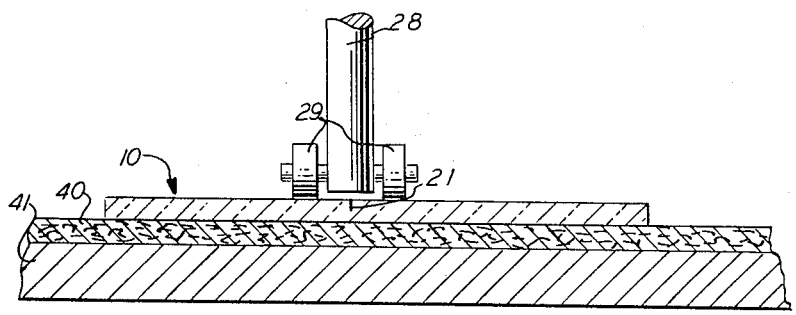
FIG. 3 is an elevational view showing further details of a portion of the apparatus.

A scoring and separating device, generally designated by the numeral 20, is shown in FIGS. 1 and 2. This device is illustrative of apparatus suitable for performing the method of this invention. As best seen in FIG. 1, the scoring and separating device 20 is guided by a guide track (not shown) around a prescribed pattern on the glass bracket 10 in order to place a score 21 on the bracket, the score defining the outer limits of the template 11. The method in which and the apparatus for guiding a scoring tool around a glass bracket is old and well known in the art so no further discussion thereof will be contained herein.

The scoring and separating device comprises two tools. The first tool of the device is a scoring tool 22 of standard construction. The scoring tool supports and conveys along the top surface of the glass bracket 10 a cutter wheel 23 which accomplishes the scoring of the glass surface. Scoring the glass surface forms fissures in the glass which extend from the scored surface downwardly into the interior of the glass but not to and through the unscored surface of the glass.

A fixed distance behind the scoring tool 22 is a separating tool 26. The separating tool forms the second tool of the scoring and separating device 20 and it is secured to and movable with the scoring tool. The separating tool 26 has in the upper portion thereof a sonic transducer for producing vibratory energy. On the lower portion of the separating tool, a shaft 28 is provided which both is connected to the transducer at one end and supports a pair of spaced wheels 29 at the other end thereof. The wheels 29, formed of a material such as steel, straddle the score 21 and, therefore, are in engagement with the surface of the glass bracket 10 on either side of the score. A horizontal and vertical pivot joint and a spring interconnection, respectively, designated by the numerals 31 and 32, allow the scoring tool 22 and the separating tool 26 to be interconnected in such a manner that the separating tool 26 follows the scoring tool around corners. The separating tool is guided around the bracket by the guide track (not shown) positioned above the bracket. The transducer of the separating tool may be an air scribe tool manufactured by Chicago Pneumatic with an output rate of 300 to 3,000 cycles per second. Also, an ultrasonic transducer may be utilized in place of the sonic transducer.

OPERATION

The method of this invention was accomplished as follows. A glass bracket 10, having a nominal thickness of ⅛ inch, was placed on a supporting medium 40 formed of hard rubber. The supporting medium was attached to a table 41. The cutter wheel 23 of the scoring tool 22 was then brought into engagement with the upper surface of the glass bracket 10 at a starting point 42 and 40 to 65 pounds of pressure was applied to the wheel 23. Movement of the scoring and separating device 20 was commenced about the guide track (not shown) to define the template 11 in the bracket 10. The apparatus for moving and guiding the scoring and separating device was of standard construction and no detailed description is given herein.

As the scoring tool 22 proceeded about the surface of the glass, the tool placed a score in the glass which caused fissures in the glass from the scored surface into the interior of the glass. Following behind the scoring tool 22 a fixed distance, four to six inches in the case of glass having a nominal ⅛ inch thickness, was the separating tool 26. The sonic transducer 27 of the separating tool 26 was vibrating at a rate of approximately 1,500 cycles per second and it drove the wheels 29, which were made of steel, to apply a vibratory pressure on the scored surface of the bracket. The down component of force on the bracket placed the lower unscored surface of the bracket in tension for a brief period of time. This caused a running of the fissures in the glass in the vicinity of the wheels 29 downwardly through the unscored surface of the glass.

Thus, as the separating tool proceeded around the score 21 behind the scoring tool 22, the glass was first scored by the cutter wheel 23 and thereafter the score was opened to complete the cutting of the glass by the application of the force on either side of the score by the wheels 29. When the scoring and separating device 20 had returned to the starting point 42, the cutting of the glass template 11 from the glass bracket 10 was completed and the template was stripped from the edge trim 12. The point of pressure application may also be directly on the score.

The invention disclosed will have many modifications which will be apparent to those skilled in the art in view of the teachings of this specification. It is intended that all modifications which fall within the scope of the appended claims.

What is claimed is:
1. A method of cutting a glass template from a glass bracket which comprises:
  supporting the glass bracket on a yieldable, supporting medium;
  scoring the glass with a continuously moving glass scoring tool along a prescribed configuration to difine a glass template shape in the glass bracket, the score producing fissures in the glass which extend downdardly from the scored surface toward the unscored surface of the glass:
  applying a pressure in the form of vibratory energy on either side of the score at a particular position, the application of pressure causing the fissures produced by the score to run through the unscored surface of the glass; and
  moving said position of application of said pressure around said score in spaced, trailing relationship to said scoring tool whereby said glass is scored and thereafter the score is opened by the application of vibratory energy to complete the cutting of the template from the bracket.
2. The method of cutting glass as specified in claim 1 wherein said glass has a nominal ⅛ inch thickness and wherein said position of appyication of vibratory energy is positioned a distance of four to six inches behind said scoring tool in its travel around the bracket.
3. The method of cutting glass as specified in claim 1 wherein said vibratory energy is produced by a vibratory device and wherein said energy is applied on either side of said score by rollers coupled to and driven by said vibration producing device.

References Cited
UNITED STATES PATENTS

| | | | |
|---|---|---|---|
| 2,219,698 | 10/1940 | Owen | 225—2 |
| 3,116,862 | 1/1964 | De Gortner | 225—2 |
| 3,169,683 | 2/1965 | Pierce | 225—2 |
| 3,372,847 | 3/1968 | Walters et al. | 225—96.5 |

JAMES M. MEISTER, Primary Examiner

U.S. Cl. X.R.

225—96.5